United States Patent
Litke et al.

(10) Patent No.: US 10,846,116 B2
(45) Date of Patent: Nov. 24, 2020

(54) CORRECTING A VOLUME CHAIN AFTER A VOLUME CREATION FAILURE IS DETECTED

(71) Applicant: Red Hat Israel, Ltd., Raanana (IL)

(72) Inventors: Adam Litke, Bethel Park, PA (US); Liron Aravot, Raanana (IL); Nir Soffer, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 469 days.

(21) Appl. No.: 15/068,450

(22) Filed: Mar. 11, 2016

(65) Prior Publication Data

US 2017/0262462 A1    Sep. 14, 2017

(51) Int. Cl.
*G06F 9/455* (2018.01)
*G06F 16/11* (2019.01)

(52) U.S. Cl.
CPC .......... *G06F 9/45558* (2013.01); *G06F 16/11* (2019.01); *G06F 2009/45579* (2013.01); *G06F 2009/45583* (2013.01)

(58) Field of Classification Search
CPC .................................................. G06F 9/4558
See application file for complete search history.

(56) References Cited

U.S. PATENT DOCUMENTS

| | | | | |
|---|---|---|---|---|
| 5,956,745 A * | 9/1999 | Bradford | ............... | G06F 3/0605 360/48 |
| 9,424,140 B1 * | 8/2016 | Madhavarapu | ..... | G06F 11/0751 |
| 2012/0047356 A1 * | 2/2012 | Filali-Adib | ............. | G06F 16/11 713/2 |
| 2017/0102881 A1 * | 4/2017 | Beeken | ................... | G06F 3/065 |

* cited by examiner

*Primary Examiner* — Van H Oberly
(74) *Attorney, Agent, or Firm* — Womble Bond Dickinson (US) LLP

(57) ABSTRACT

A system and method are disclosed for detecting and handling volume creation failures. In one implementation, a request to create a new volume in a volume chain for a virtual machine is received. A processing device creates a first metadata file for the new volume, where the first metadata file has a first filename indicating that creation of the new volume has not completed. A reference to a parent volume of the new volume is stored in the first metadata file, along with an indication that the new volume is a leaf of the volume chain. A second metadata file that is associated with the parent volume is updated in view of the new volume. The processing device creates a data file for the new volume and renames the first metadata file to a second filename indicating that creation of the new volume has completed.

20 Claims, 6 Drawing Sheets

CORRECTING A VOLUME CHAIN AFTER A VOLUME CREATION FAILURE IS DETECTED

TECHNICAL FIELD

Embodiments of the present disclosure relate to virtual machines and, more specifically, to correcting a volume chain after a volume creation failure is detected in a shared storage environment.

BACKGROUND

A virtual machine (VM) may be a software-based emulation of computer hardware. For example, the VM may operate based on computer architecture and functions of computer hardware resources associated with hard disks or other such memory. A virtual disk that emulates a hard disk or memory may be used by the VM. Thus, the VM may emulate a physical computing environment, and requests for a hard disk or memory may be managed by a virtualization layer which translates these requests to the underlying physical computing hardware resources. The virtualization layer may be part of a virtual machine management application that manages the virtual disk.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
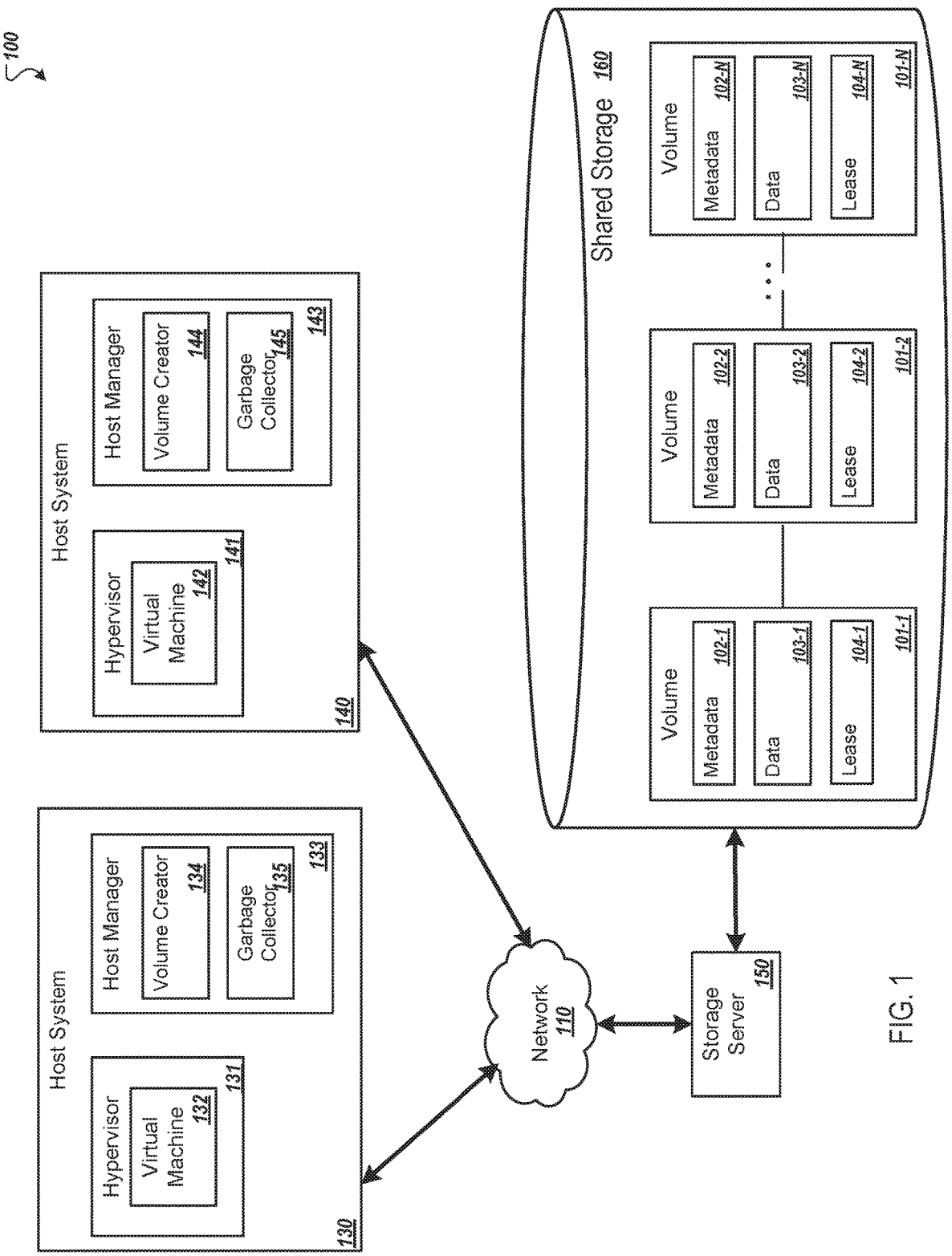
FIG. 1 depicts an illustrative computer system architecture, in accordance with an embodiment of the present disclosure.

Described herein is a system and methods for detecting and handling volume creation failures in both file-based storage environments (e.g., Network File System [NFS], New Technology File System [NTFS], Server Message Block [SMB], Common Internet File System [CMS], etc.) and block-based storage environments (e.g., Internet Small Computer System Interface [iSCSI], Fibre Channel over Ethernet [FCoE], etc.).

A distributed computer system may comprise a plurality of host computer systems managed by a virtualization manager. Each host computer system may be communicatively coupled, via a network, to one or more storage domains that store disk images of virtual machines. "Storage domain" herein refers to an atomic storage unit, such as a mount point or a folder for a file based storage, or a group of logical unit numbers (LUNs) for a block-based storage. In various illustrative examples, storage domains may employ file-based or block-based storage for storing one or more virtual machine disk images, the domain metadata and the domain lease. The domain metadata represents information that may be utilized for domain identification, management, creation, modification, removal, and/or other operations. The domain lease represents information that may be utilized for managing access to the storage domain.

Each virtual machine disk image may comprise a set of volumes organized into a copy-on-write chain. Such a copy-on-write chain is referred to herein as a volume chain associated with a virtual machine. Each volume in the volume chain may comprise the volume data, the volume metadata, and the volume lease. The volume data area may be employed for storing the disk image data. The volume metadata area may be employed to indicate whether the volume has any children in the volume chain, an identifier of the volume's parent (if any) in the volume chain, and/or other information that may be utilized for volume identification, management, creation, modification, removal, and/or for performing file operations with respect to the files stored on the volume. The volume lease area may be employed for storing the information that may be utilized for managing access to the volume.

A volume at the end of the volume chain associated with the virtual machine disk image has no children and is referred to as a leaf volume. When creating a snapshot of the virtual machine disk, a new leaf volume can be added to the end of the volume chain. The metadata associated with the former leaf volume should be updated to reflect that the volume is no longer a leaf. However, if the new volume creation is interrupted, the metadata of the former leaf volume should be corrected to indicate that the volume is once again a leaf volume.

Aspects of the present disclosure enable identification and resolution of the situation described above. In one implementation that might be employed in file-based storage environments, a request to create a new volume in a volume chain for a virtual machine is received. A processing device creates a first metadata file for the new volume, where the first metadata file has a first filename indicating that creation of the new volume has not completed (e.g., by naming the file with a temporary '.tmp' extension, etc.). A reference to a parent volume of the new volume is stored in the first metadata file, along with an indication that the new volume is a leaf of the volume chain. A second metadata file that is associated with the parent volume is updated in view of the new volume. The processing device creates a data file for the new volume and renames the first metadata file to a second filename indicating that creation of the new volume has completed (e.g., by removing a temporary '.tmp' extension, etc.).

In one implementation, the renaming of the first metadata file is atomic (e.g., indivisible and isolated from any concurrent processes), and the updating of the second metadata file changes the status of the parent volume from a leaf of the volume chain to an internal volume of the volume chain. In one example, the processing device also creates a lease file for the volume that may contain a lock controlling access to the new volume. In one implementation, the data file for the new volume may be initialized by writing one or more headers to the data file.

In one implementation that might be employed in file-based storage environments, a garbage collection background process executed by a processing device identifies a volume that belongs to a volume chain for a virtual machine and that includes a metadata file, a data file, and a lease file. The processing device determines, in view of the filename of the metadata file, that creation of the volume has not completed. In one example, it is inferred that, in view of the non-completion of the creation of the volume, a failure occurred during the creation of the volume.

In response to successfully reading contents of the metadata file and identifying, from the contents of the metadata file, a parent volume of the volume in the volume chain, a metadata file associated with the parent volume is updated if necessary. Cleanup of the failed creation of the volume is completed by removal of the lease file, the data file, and the metadata file.

In one implementation that might be employed in block-based storage environments, when a request to create a new volume in a volume chain for a virtual machine is received, a processing device creates a data area for the new volume and writes to a shared storage device a tag indicating that creation of the new volume has not completed. The processing device allocates space for a first metadata area for the new volume, stores in the first metadata area a reference to a parent volume of the new volume in the volume chain, as well as an indication that the new volume is a leaf of the volume chain. A second metadata area that is associated with the parent volume is updated in view of the new volume (e.g., changing the status of the parent volume from a leaf to an interior volume, etc.), and the tag is removed from the shared storage device.

In one implementation, creation of the data area, creation of the tag, and writing of the tag to shared storage is atomic. In one example, the processing device also allocates space for a lease area for the volume that may contain a lock controlling access to the new volume. In one implementation, the data area for the new volume may be initialized by writing one or more headers to the data file.

In one implementation that might be employed in block-based storage environments, a garbage collection background process executed by a processing device identifies a volume that belongs to a volume chain for a virtual machine and that includes a metadata area, a data area, and a lease area. The processing device identifies a tag associated with the volume indicating that creation of the volume has not completed. In one example, it is inferred that, in view of the non-completion of the creation of the volume, that a failure occurred during the creation of the volume.

The garbage collection process removes the lease area and attempts to read the contents of the metadata area. In response to successfully reading contents of the metadata area and identifying, from the contents of the metadata area, a parent volume of the volume in the volume chain, a second metadata area associated with the parent volume is updated if necessary. Cleanup of the failed creation of the volume is completed by removal of the metadata area and the data area.

Implementations of the present disclosure thus enable the detection and handling of failed attempts to create volumes in both file-based and block-based storage environments.

FIG. 1 is an illustrative system architecture 100 for various implementations of the disclosure. The system architecture 100 includes host systems 130 and 140 coupled to one or more storage servers 150 via a network 110. The network 110 may be a public network (e.g., the Internet), a private network (e.g., a local area network (LAN) or wide area network (WAN)), or a combination thereof. Network 110 may include a wireless infrastructure, which may be provided by one or multiple wireless communications systems, such as a wireless fidelity (WiFi) hotspot connected with the network 110 and/or a wireless carrier system that can be implemented using various data processing equipment, communication towers, etc.

The host systems 130 and 140 may each include a hypervisor (e.g., hypervisors 131 or 141) that are each associated with a virtual machine (e.g., virtual machine 132 and virtual machine 142), and a host manager (e.g., host manager 133 or host manager 143). The host systems 130 or 140 may include, but are not limited to, desktop computers, laptop computers, rackmount servers, routers, switches, tablet computers, mobile phones, or any other type of computing device. The host systems 130 and 140 may include hardware resources that may include one or more processing devices, memory, and/or additional devices including, but not limited to, a graphics card, hardware RAID controller, network controller, hard disk drive, universal serial bus (USB) device, internal input/output (I/O) device, keyboard, mouse, speaker, etc. The hardware resources may be used to execute software, including one or more operating systems, virtual machines (e.g., a virtual machine based on a mobile communications device), or other applications.

In certain implementations, host computer systems 130, 140 may be grouped into one or more logical groups which may be also referred to as "data centers" (not shown). A data center may represent the highest level of abstraction in the virtualization model. Each data center and/or host systems 130, 140 may be communicatively coupled, via a network 110 and storage server 150, to shared storage 160 that can have one or more storage domains, including data storage domains to store disk images of virtual machines 132, 142.

Each disk image may be represented by a volume chain comprising one or more copy-on-write (COW) volumes. From the perspective of a virtual machine, these volumes appear as a single disk image, as the hypervisor presents the virtual disk to a virtual machine and implements the associated disk read-write operations. Initially, a virtual machine disk image may only comprise one raw or COW volume, which may be made read-only before the first boot of the virtual machine. An attempt to write to a disk by a virtual machine may trigger adding a new COW volume to the volume chain. The newly created volume may be made writable, and may only store disk blocks or files which were modified or newly created by the virtual machine after the previous volume had been made read-only.

One or more volumes may be added to the volume chain during the lifetime of the virtual machine. Adding a new COW volume may be triggered by making the previous volume read-only (e.g., responsive to receiving a command via an administrative interface). The virtual disk device implemented by the hypervisor locates the data by accessing, transparently to the virtual machine, each volume of the chain of volumes, starting from the most recently added volume.

The hardware resources of a host system may provide one or more services such as, but not limited to, networking services, storage services, and software libraries. In some embodiments, the hypervisor (e.g., hypervisor 131 or 141), also referred to as a virtual machine monitor (VMM) and/or a virtual machine (e.g., virtual machine 132 or 142) may use the one or more services that are provided by the host system. The hypervisors 131 or 141 is an application that executes on a host system 130 or 140 to manage virtual machines 132 or 142. In particular, the hypervisor may instantiate or start, migrate, pause, or perform another type of event associated with virtual machines 132 and 142.

In one implementation, host manager 133/143 includes a volume creator 134/144 and a garbage collector 135/145. Some operations of volume creator 134/144 are described in detail below with respect to FIGS. 2 and 4. Some operations of garbage collector 135/145 are described in detail below with respect to FIGS. 3 and 5.

The storage server 150 is capable of receiving requests via network 110 (e.g., from host systems 130 or 140, etc.) to store or retrieve data. In one example, data is stored by a shared storage device 160 (e.g., a magnetic hard disk, a Universal Serial Bus [USB] solid state drive, a Redundant Array of Independent Disks [RAID] system, a network attached storage [NAS] array, etc.) with which storage server 150 communicates to store and retrieve data. In some implementations, computer system 100 might employ a file-based storage environment such as Network File System (NFS), New Technology File System (NTFS), Server Message Block (SMB), Common Internet File System (CIFS), etc., while in some other implementations, computer system 100 might employ a block-based storage environment such as Internet Small Computer System Interface (iSCSI), Fibre Channel over Ethernet (FCoE), etc.

It should be noted that although, for simplicity, a single storage server 150 and a single shared storage device 160 are depicted in FIG. 1, in some examples, computer system 100 might include a plurality of storage servers 150 and/or a plurality of shared storage devices 160.

In accordance with one example, the shared storage device 160 stores a volume chain for a virtual machine (e.g., VM 132, VM 142, etc.). As shown in FIG. 1, the volume chain comprises volumes 101-1 through 101-N, where N is a positive integer. In one implementation, volume 101 comprises a metadata file/area 102 that stores information about the volume, a data file/area 103 that stores data in the volume (e.g., disk image data), and a lease file/area 104 that controls access to the volume, where files are employed in file-based storage environments (e.g., NFS, NTFS, SMB, CIFS, etc.), and areas are employed in block-based storage environments (e.g., iSCSI, FCoE, etc.). In one example, information contained in the metadata file/area 102 might include references to associated volumes (e.g., to parent or child volumes in a copy-on-write chain) as well as data enabling the identification, management, creation, modification, removal, etc. of the volume.

In one example, lease file/area 104 provides a decentralized locking facility to prevent conflicting access by hosts to the same volume. In some implementations, a lease might have a certain expiration period, potentially extendable by the requesting host. It should be noted that although, for simplicity, a single volume chain is depicted in FIG. 1, in some examples the shared storage device might store a plurality of volume chains (e.g., for each of a plurality of VMs, etc.).

Figure 2:
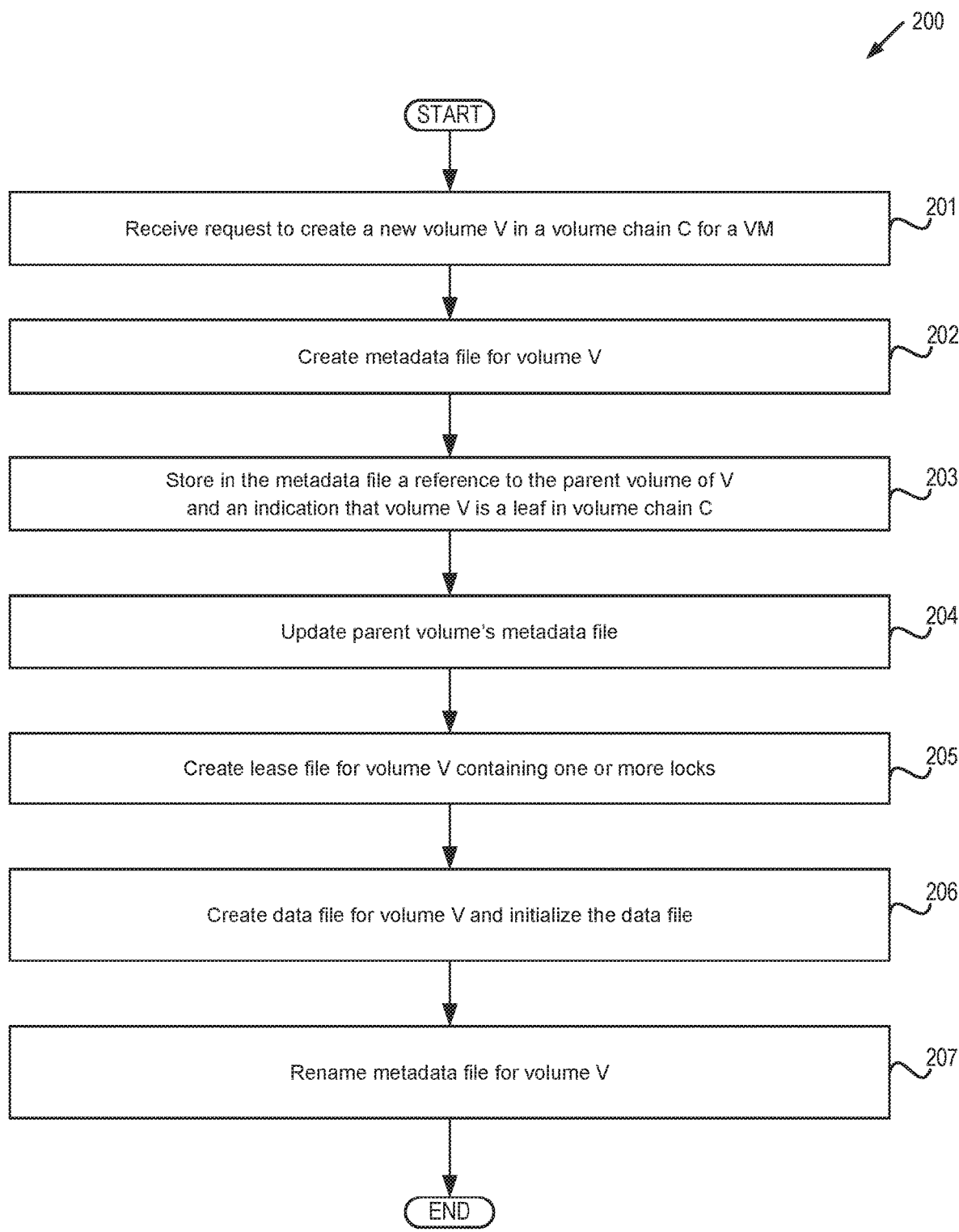
FIG. 2 depicts a flow diagram of one example of a first method for creating a volume for a virtual machine.

FIG. 2 depicts a flow diagram of one example of a first method 300 for creating a volume for a virtual machine in a file-based storage environment (e.g., a Network Attached Storage [NAS] system implementing a protocol such as Network File System [NFS], New Technology File System [NTFS] Server Message Block [SMB], Common Internet File System [CIFS], etc.). The method is performed by processing logic that may comprise hardware (circuitry, dedicated logic, etc.), software (such as is run on a general purpose computer system or a dedicated machine), or a combination of both. In one example, the method is performed by computer system 100 of FIG. 1. It should be noted that in some embodiments blocks depicted in FIG. 3 may be performed simultaneously or in a different order than that depicted.

At block 201, a request is received to create a new volume V in a volume chain C for a virtual machine (e.g., VM 132 of host system 130, VM 142 of host system 140, etc.) The request might be submitted by a system administrator, a user, an application, etc. In one implementation, the request is received by a host manager volume creator hosted by the same machine as the particular VM (e.g., volume creator 134 of host system 130, volume creator 134 of host system 140, etc.).

At block 202, a metadata file for volume V is created (e.g., a metadata file 102 in a memory portion of volume V, etc.). In one example, the name of the metadata file indicates that the creation of volume V has not completed (e.g., a temporary file, denoted by a .tmp extension). In one implementation, the metadata file is created by the volume creator in response to the request received at block 201.

At block 203, a reference to the parent volume of V in volume chain C is stored in the metadata file, as well as an indication that volume V is a leaf in volume chain C. In one example, the reference is a volume identifier (ID) associated with the parent volume, and the fact that volume V is a leaf, as opposed to a non-leaf interior volume, is indicated via a flag. In one implementation, the storing of the reference and the indication is an atomic operation.

At block 204, the parent volume's metadata file is updated to reflect the fact that the parent volume will now be an internal volume rather than a leaf (e.g., by toggling a leaf/non-leaf flag in the parent volume's metadata file, etc.) in view of the creation of volume V. In one implementation, the updating of the parent volume's metadata file might be included in a single atomic operation with the storing of the reference and indication at block 203.

At block 205, a lease file for volume V containing one or more locks is created (e.g., a lease file 104 in a memory portion of volume V, etc.). In one implementation, the lease file contains a lock that controls access to the volume.

At block 206, a data file for volume V is created (e.g., a data file 103 in a memory portion of volume V, etc.) to store data written to volume V after the creation of the volume. In one example, the data file is also initialized (e.g., by writing one or more headers to the data file, etc.).

At block 207, the metadata file for volume V is renamed to indicate that the creation of volume V has completed (e.g., by removing a .tmp extension in the filename, etc.). In one implementation, the renaming is achieved using an atomic operation. After block 207, volume V may be written to (e.g., by the VM associated with the volume chain, etc.).

Figure 3:
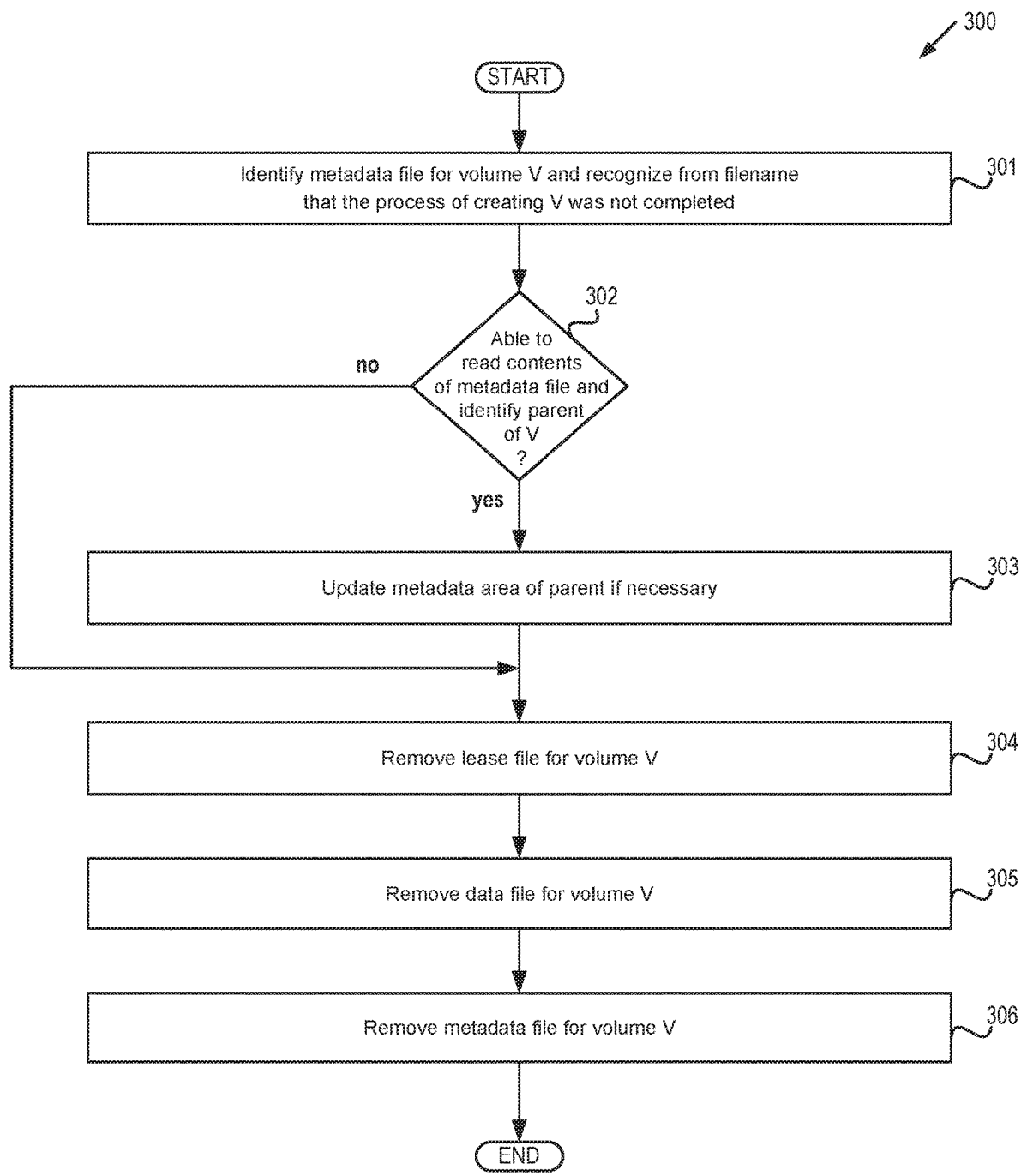
FIG. 3 depicts a flow diagram of one example of a first method for detecting and handling a failure that occurs during creation of a volume.

FIG. 3 depicts a flow diagram of one example of a first method 300 for detecting and handling a failure that occurs during creation of a volume V for a virtual machine in a file-based storage environment (e.g., an NAS system implementing a protocol such as NFS, NTFS, Server Message Block [SMB], Common Internet File System [CIFS], etc.). The method is performed by processing logic that may comprise hardware (circuitry, dedicated logic, etc.), software (such as is run on a general purpose computer system or a dedicated machine), or a combination of both. In one example, the method is performed by a garbage collection background process (e.g., garbage collector 135 or 145 of the computer system 100 of FIG. 1, etc.). It should be noted that in some embodiments blocks depicted in FIG. 3 may be performed simultaneously or in a different order than that depicted.

At block 301, a garbage collection background process (e.g., garbage collector 135 or 145, etc.) identifies a metadata file for a volume V and recognizes, in view of the metadata file's filename (e.g., in view of a .tmp file extension, etc.), that the process of creating volume V (e.g., by a process executing method 200 of FIG. 2, etc.) was not completed. In one example, the garbage collection background process further infers that, in view of the fact that the creation was not completed, a failure occurred during the creation of volume V.

Block 302 branches based on whether the garbage collection background process is able to read the contents of the metadata file for volume V and identify the parent volume of volume V. If not, execution continues at block 304, otherwise execution proceeds to block 303.

At block 303, the parent volume's metadata file is updated if necessary to indicate that the parent volume reverts to a leaf rather than an internal volume (e.g., by toggling a leaf/non-leaf flag in the parent volume's metadata file, etc.). For example, a non-completed process to create volume V might have updated the leaf/non-leaf flag to "non-leaf" prior to the process failing.

At block 304, the lease file for volume V (if present) is removed, at block 305 the data file for volume V (if present) is removed, and at block 306 the metadata file for volume V (if present) is removed. It should be noted that in some other examples, the removal of these files may be performed in an alternative order. It should further be noted that in some implementations the removal of these files might be atomic, while in some other implementations the removal of these files might not be atomic.

Figure 4:
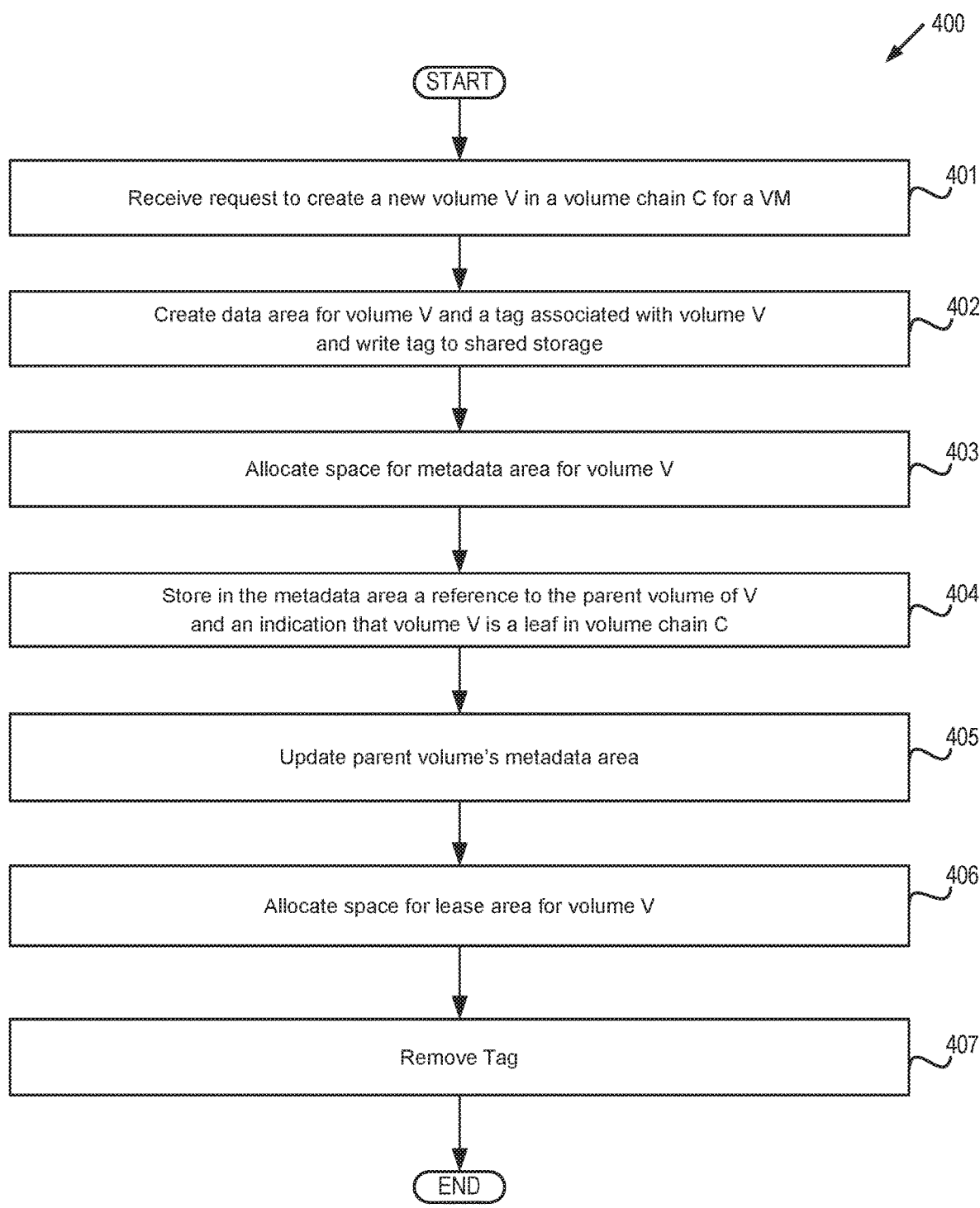
FIG. 4 depicts a flow diagram of one example of a second method for creating a volume for a virtual machine.

FIG. 4 depicts a flow diagram of one example of a second method 500 for creating a volume for a virtual machine in a block-based storage environment such as Internet Small Computer System Interface (iSCSI), Fibre Channel over Ethernet (FCoE), etc. The method is performed by processing logic that may comprise hardware (circuitry, dedicated logic, etc.), software (such as is run on a general purpose computer system or a dedicated machine), or a combination of both. In one example, the method is performed by computer system 100 of FIG. 1. It should be noted that in some embodiments blocks depicted in FIG. 4 may be performed simultaneously or in a different order than that depicted.

At block 401, a request is received to create a new volume V in a volume chain C for a virtual machine (e.g., VM 132 of host system 130, VM 142 of host system 140, etc.) The request might be submitted by a system administrator, a user, an application, etc. In one implementation, the request is received by a host manager volume creator hosted by the same machine as the particular VM (e.g., volume creator 134 of host system 130, volume creator 134 of host system 140, etc.).

At block 402, a data area for volume V and a tag associated with volume V are created (e.g., a data area 103 in a memory portion of volume V, etc.) and the tag is written to shared storage (e.g., shared storage device 160 of FIG. 1, etc.). In one example, the tag indicates that the creation of volume V has not completed.

In one implementation, a logical volume manager [LVM] (not depicted in FIG. 1) manages the tag associated with volume V of volume chain C, as well as tags associated with other volumes and/or volume chains not depicted in FIG. 1. In one example, the data area might also be initialized (e.g., by writing one or more headers to the data file, etc.).

At block 403, space for a metadata area for volume V is created (e.g., a metadata area 102 in a memory portion of volume V, etc.). In one implementation, the metadata area is created by the volume creator in response to the request received at block 401.

At block 404, a reference to the parent volume of V in volume chain C is stored in the metadata area, as well as an indication that volume V is a leaf in volume chain C. In one example, the reference is a volume identifier (ID) associated with the parent volume, and the fact that volume V is a leaf, as opposed to a non-leaf interior volume, is indicated via a flag. In one implementation, the storing of the reference and the indication is an atomic operation.

At block 405, the parent volume's metadata area is updated to reflect the fact that the parent volume will now be an internal volume rather than a leaf (e.g., by toggling a leaf/non-leaf flag in the parent volume's metadata area, etc.) in view of the creation of volume V. In one implementation, the updating of the parent volume's metadata area might be included in a single atomic operation with the storing of the reference and indication at block 404.

At block 406, space for a lease area for volume V containing one or more locks is allocated (e.g., a lease area 104 in a memory portion of volume V, etc.). In one implementation, the lease area contains a lock that controls access to the volume.

At block 407, the tag for volume V is removed to indicate that the creation of volume V has completed. After block 407, volume V may be written to (e.g., by the VM associated with the volume chain, etc.).

Figure 5:
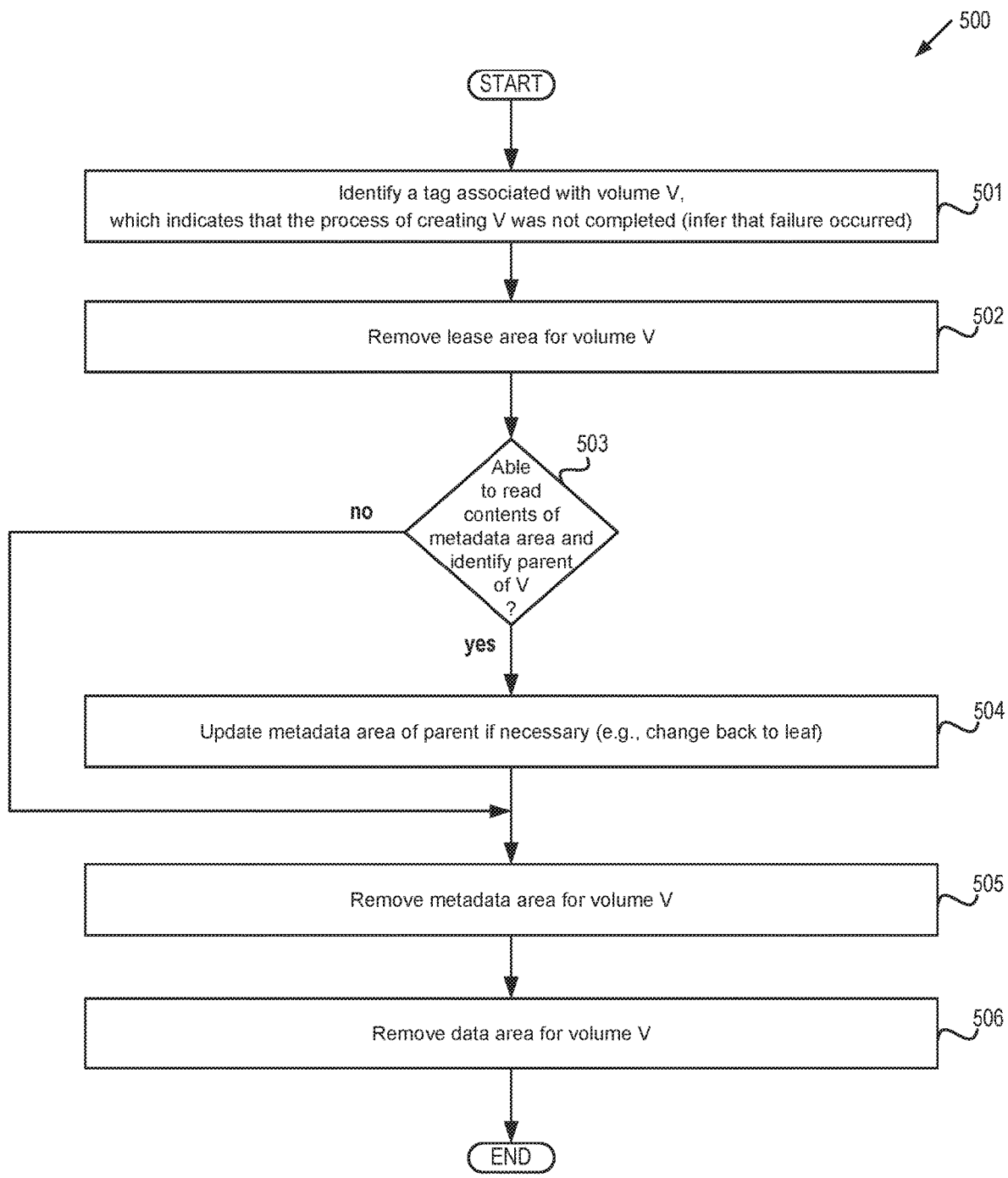
FIG. 5 depicts a flow diagram of one example of a second method for detecting and handling a failure that occurs during creation of a volume.

FIG. 5 depicts a flow diagram of one example of a second method 500 for detecting and handling a failure that occurs during creation of a volume V for a virtual machine in a block-based storage environment such as Internet Small Computer System Interface (iSCSI), Fibre Channel over Ethernet (FCoE), etc. The method is performed by processing logic that may comprise hardware (circuitry, dedicated logic, etc.), software (such as is run on a general purpose computer system or a dedicated machine), or a combination of both. In one example, the method is performed by a garbage collection background process (e.g., garbage collector 135 or 145 of the computer system 100 of FIG. 1, etc.). It should be noted that in some embodiments blocks depicted in FIG. 5 may be performed simultaneously or in a different order than that depicted.

At block 501, a garbage collection background process (e.g., garbage collector 135 or 145, etc.) identifies a tag associated with a volume V, which indicates that that the process of creating volume V (e.g., by a process executing method 400 of FIG. 4, etc.) was not completed. In one example, the garbage collection background process further infers that, in view of the fact that the creation was not completed, a failure occurred during the creation of volume V.

At block 502, the lease area for volume V (if allocated) is removed. Block 503 branches based on whether the garbage collection background process is able to read the contents of the metadata area for volume V and identify the parent volume of volume V. If not, execution continues at block 505, otherwise execution proceeds to block 504.

At block 504, the parent volume's metadata file is updated if necessary to indicate that the parent volume reverts to a leaf rather than an internal volume (e.g., by toggling a leaf/non-leaf flag in the parent volume's metadata file, etc.). For example, a non-completed process to create volume V might have updated the leaf/non-leaf flag to "non-leaf" prior to the process failing.

At block 505 the metadata file for volume V (if present) is removed, and at block 506 the data file for volume V (if present) is removed, and. It should be noted that in some other examples, the removal of these files may be performed in the opposite order. It should further be noted that in some implementations the removal of these files might be atomic, while in some other implementations the removal of these files might not be atomic.

Figure 6:
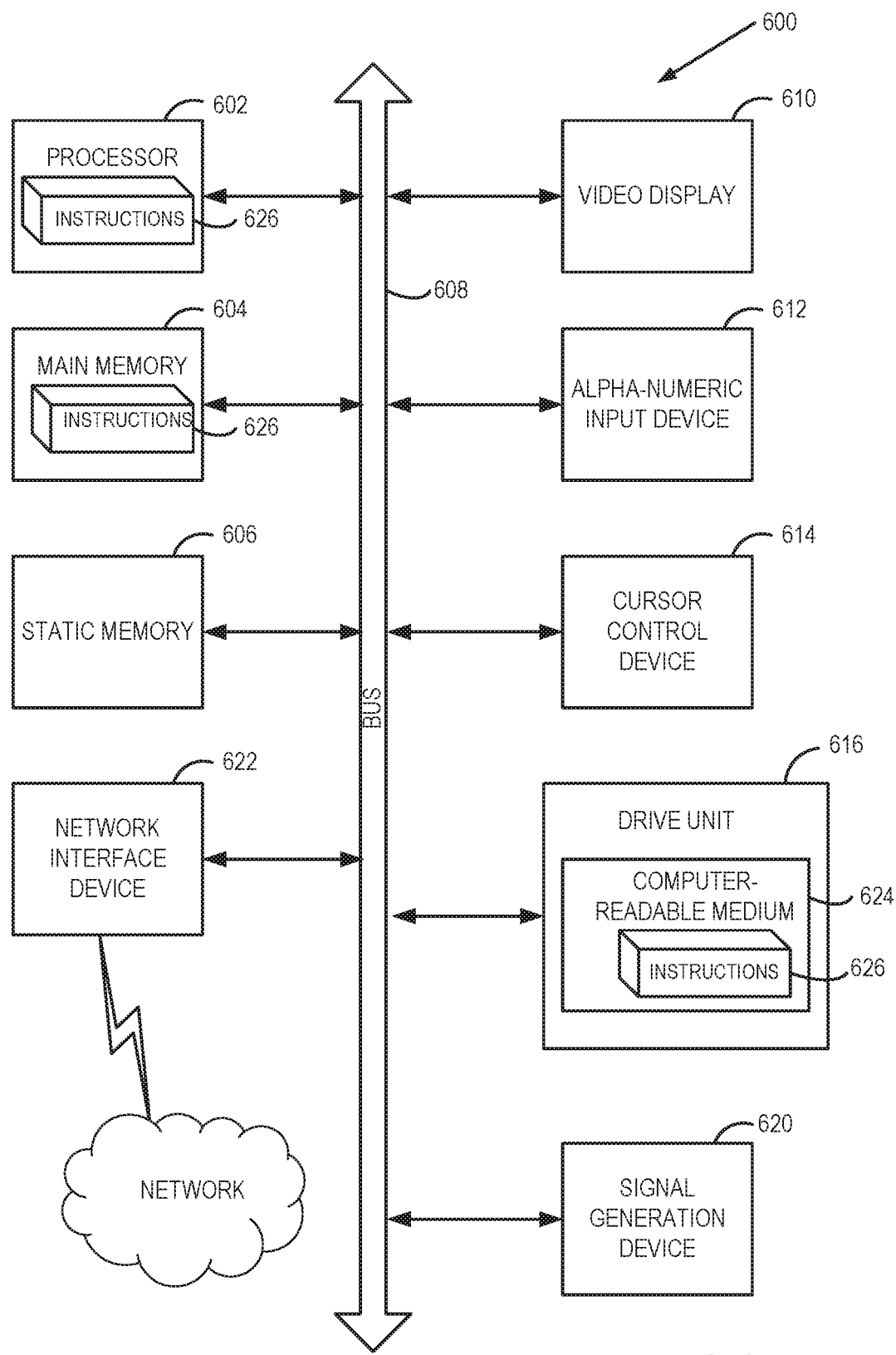
FIG. 6 depicts a block diagram of an illustrative computer system operating in accordance with embodiments of the disclosure.

FIG. 6 illustrates a diagrammatic representation of a machine in the example form of a computer system 600 within which a set of instructions, for causing the machine to perform any one or more of the methodologies discussed herein, may be executed. The computer system 600 may correspond to host system 130 or 140 of FIG. 1. In embodiments of the present disclosure, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The illustrative computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 616 (e.g., a data storage device), which communicate with each other via a bus 608.

The processing device 602 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 602 may therefore include multiple processors. The processing device 602 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 602 may also be one or more special-purpose processing devices such as an application specific integrated circuit (ASIC), a field programmable gate array (FPGA), a digital signal processor (DSP), network processor, or the like.

The computer system 600 may further include one or more network interface devices 622 (e.g., NICs). The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions 454 embodying any one or more of the methodologies or functions described herein (e.g., the methods of FIGS. 3 through 6, etc.). The instructions 454 may also reside, completely or at least partially, within the main memory 604 and/or within the processing device 602 during execution thereof by the computer system 600; the main memory 604 and the processing device 602 also constituting machine-readable storage media.

While the computer-readable storage medium 624 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine that cause the machine to perform any one or more of the methodologies of the present disclosure. The term "computer-readable storage medium" shall accordingly be taken to include, but not be limited to, non-transitory media such as solid-state memories, and optical and magnetic media.

The modules, components and other features described herein can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in a combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "creating", "storing", "updating", "renaming", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present disclosure also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Although the present disclosure has been described with reference to specific example embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
   receiving a request to create a new volume in a volume chain for a virtual machine;
   creating, by a processing device, a first metadata file for the new volume, wherein the first metadata file has a first filename, the first filename indicating that creation of the new volume has not completed;
   storing, in the first metadata file, a reference to a parent volume of the new volume in the volume chain, and an indication that the new volume is a leaf of the volume chain;
   updating, in view of the new volume, a second metadata file that is associated with the parent volume;
   creating, by the processing device, a data file for the new volume;
   in response to successful creation of the new volume, renaming, by the processing device, the first metadata file to a second filename indicating that creation of the new volume has completed to enable management of access to the new volume; and
   in response to renaming the first metadata file to the second filename, providing the virtual machine with write access to the data file of the new volume.

2. The method of claim 1 further comprising creating a lease file that contains a lock controlling access to the new volume.

3. The method of claim 1 further comprising initializing the data file for the new volume.

4. The method of claim 1 wherein the renaming is atomic.

5. The method of claim 1 wherein the updating of the second metadata file comprises changing a status of the parent volume from a leaf of the volume chain to an internal volume of the volume chain.

6. The method of claim 1 wherein the virtual machine writes to the data file of the new volume after the renaming.

7. An apparatus comprising:
   a memory to store a virtual machine; and
   a processing device, operatively coupled to the memory, to:
   receive a request to create a new volume in a volume chain for the virtual machine,
   create a data area for the new volume and write, to a shared storage device, a tag indicating that creation of the new volume has not completed,
   allocate space for a first metadata area for the new volume store, in the first metadata area, a reference to a parent volume of the new volume in the volume chain, and an indication that the new volume is a leaf of the volume chain,
   update, in view of the new volume, a second metadata area that is associated with the parent volume;
   in response to successful creation of the new volume, remove the tag from the shared storage device to enable management of access to the shared storage device; and
   in response to removing the tag, provide the virtual machine with write access to the data file of the new volume.

8. The apparatus of claim 7 wherein the processing device is further to allocate space for a lease area containing a lock that controls access to the new volume.

9. The apparatus of claim 7 wherein the processing device is further to initialize the data area for the new volume.

10. The apparatus of claim 9 wherein the initializing comprises writing one or more headers to the data area.

11. The apparatus of claim 7 wherein the processing device is further to create the tag, and wherein the creation of the data area and the creation of the tag and the writing of the tag is atomic.

12. The apparatus of claim 7 wherein the virtual machine writes to the data area of the new volume after the removal of the tag.

13. A method comprising:
   identifying a volume comprising a first metadata file, a data file, and a lease file, wherein the volume belongs to a volume chain for a virtual machine;
   determining by a processing device, in view of a filename of the first metadata file, that creation of the volume has not completed;
   in response to successfully reading contents of the metadata file and identifying, from the contents of the metadata file, a parent volume of the volume in the volume chain, updating a second metadata file that is associated with the parent volume; and
   removing, by the processing device, the lease file, the data file, and the metadata file to enable management of access to the parent volume; and
   providing the virtual machine with write access to a data file of the parent volume.

14. The method of claim 13 wherein the updating of the second metadata file comprises changing a status of the parent volume from an internal volume of the volume chain to a leaf of the volume chain.

15. The method of claim 13 wherein the lease file is removed prior to removing the data file.

16. The method of claim 15 wherein the data file is removed prior to removing the metadata file.

17. A non-transitory computer readable storage medium, having instructions stored therein, which when executed, cause a processing device to:
   identify, by the processing device, a volume comprising a first metadata area, a data area, and a lease area, wherein the volume belongs to a volume chain for a virtual machine;
   identify, by the processing device, a tag associated with the volume, the tag indicating that creation of the volume has not completed;
   remove the lease area;
   in response to successfully reading contents of the metadata area and identifying, from the contents of the metadata area, a parent volume of the volume in the volume chain, update a second metadata area that is associated with the parent volume; and
   remove the metadata area and the data area to enable management of access to the parent volume;
   provide the virtual machine with write access to a data file of the virtual machine.

18. The non-transitory computer readable storage medium of claim 17 wherein the updating of the second metadata area comprises changing a status of the parent volume from an internal volume of the volume chain to a leaf of the volume chain.

19. The non-transitory computer readable storage medium of claim 17 wherein the metadata area is removed prior to removing the data area.

20. The non-transitory computer readable storage medium of claim 17 wherein the lease area is removed after the identification of the tag, and wherein the metadata area is removed after the identification of the parent volume from the contents of the metadata area.

* * * * *